July 25, 1950  M. G. PAWLEY  2,516,144
MOTOR CONTROL CIRCUIT
Filed Aug. 3, 1945  3 Sheets-Sheet 2

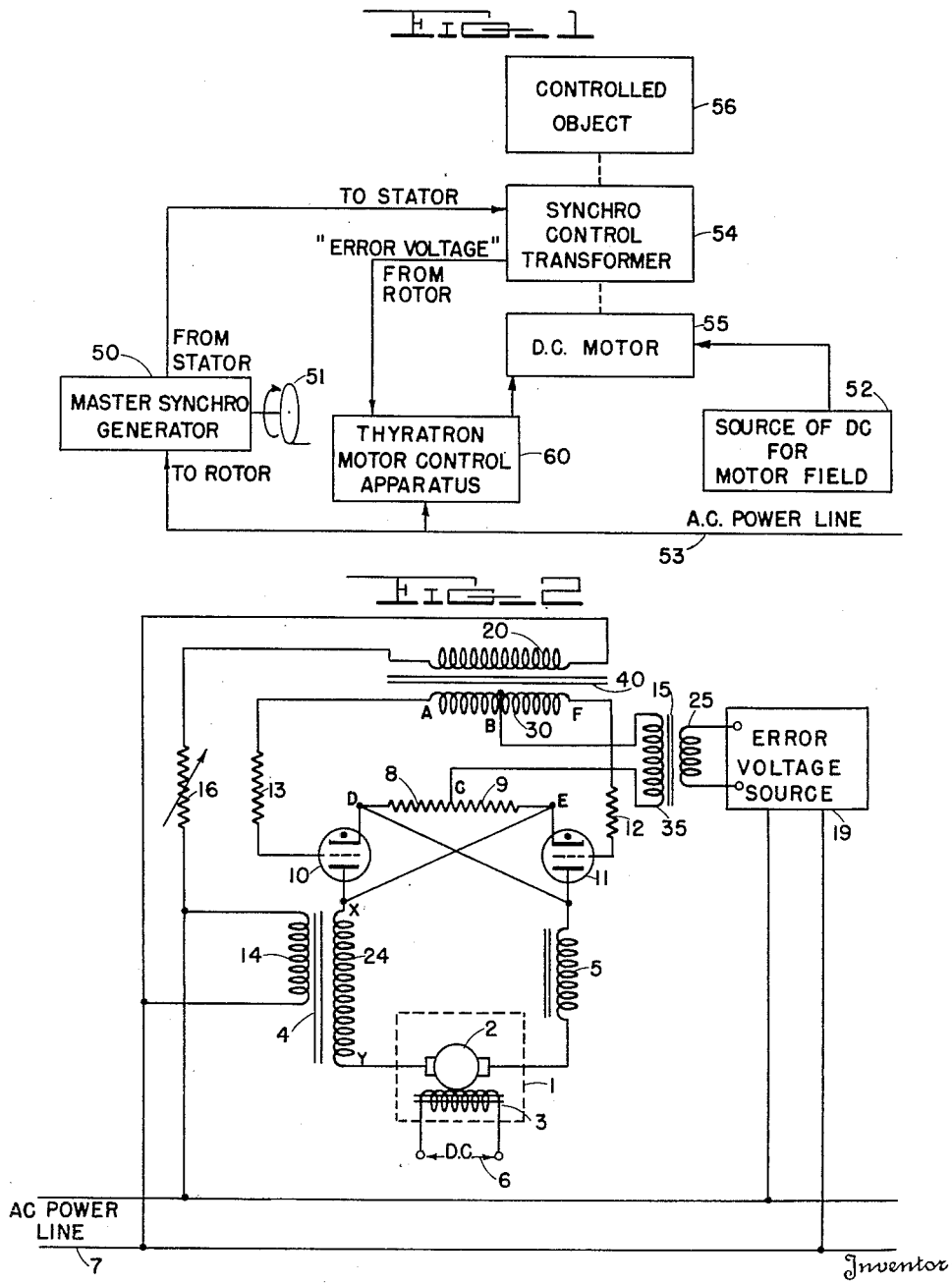

Voltages governing operation of tube 10 (error voltage zero)

Voltages governing operation of tube 11 (error voltage zero)

Inventor
MYRON G. PAWLEY
By Ralph L Chappell
Attorney

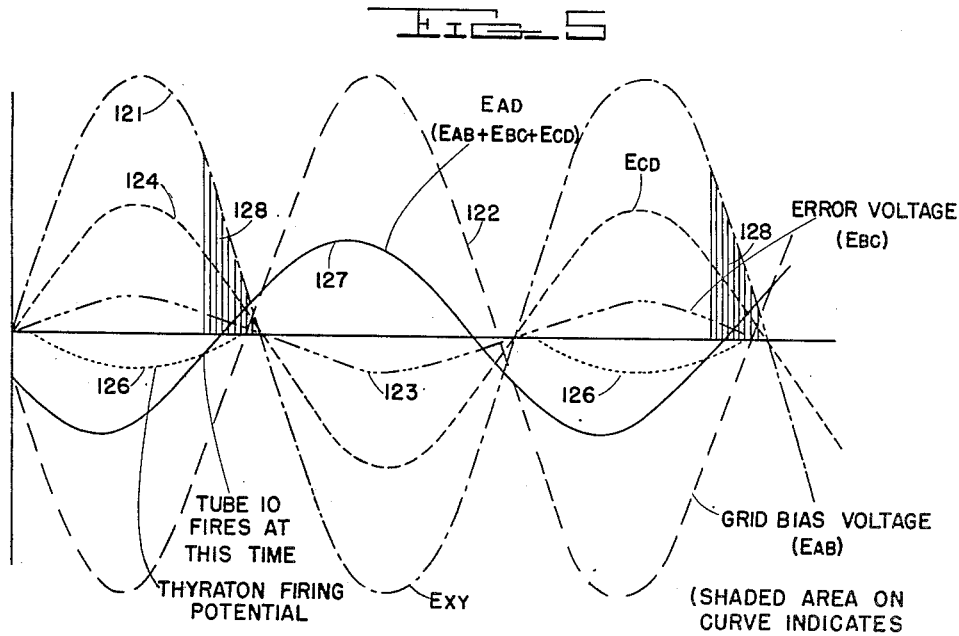
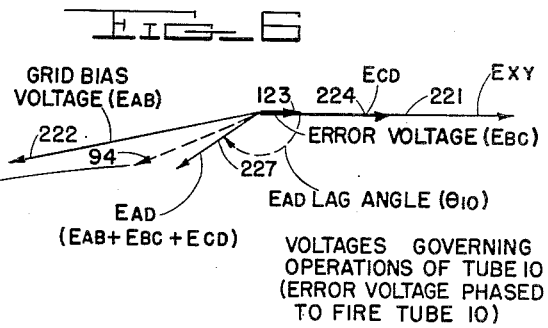
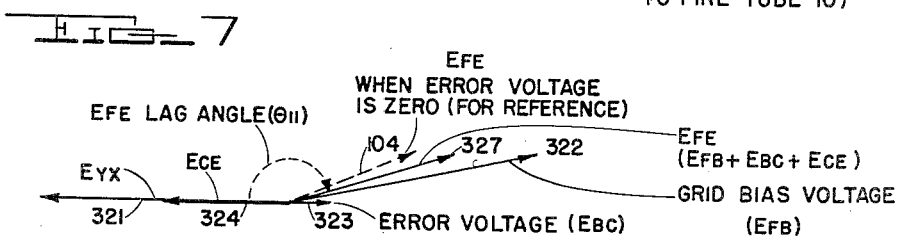

Patented July 25, 1950

2,516,144

UNITED STATES PATENT OFFICE 2,516,144

MOTOR CONTROL CIRCUIT

Myron G. Pawley, Alexandria, Va.

Application August 3, 1945, Serial No. 608,812

5 Claims. (Cl. 318—257)

(Granted under the act of March 3, 1883, as amended April 30, 1928; 370 O. G. 757)

This invention relates to rectifier systems; it is particularly directed to a system for controlling, by the use of grid-controlled, gas-filled rectifier tubes, the magnitude and direction of the current in a load circuit.

An object of the invention is to provide simple apparatus by which the magnitude and direction of the current flowing in a load circuit may be smoothly and continuously varied in response to a control voltage from a low power source.

Another object of the invention is to provide simple apparatus by which the speed and direction of rotation of direct-current motors may be smoothly varied in response to control voltage from a low power source.

A further object of the invention is to provide apparatus possessing inherent anti-hunting and dynamic braking properties, for use in direct-current motor control systems.

Still another object of the invention is to provide apparatus, simpler than heretofore practicable, for remotely controlling the position of a motor-driven object.

Still a further object of the invention is to provide apparatus, simpler than heretofore practicable, by the use of which angular displacement introduced in control apparatus of small mass and inertia may be made to produce similar angular displacement to an object of great mass and inertia.

The invention comprises a novel rectifier system using grid-controlled rectifier tubes of the type commonly called "Thyratron." It is simpler and uses fewer components than previous systems directed to the same objects.

Further description of the invention will be made with reference to the appended drawings, of which:

Figure 1 is a block diagram showing how the invention may be used, in conjunction with other apparatus, to achieve by electrical means remote control of the position of an object.

Figure 2 is a schematic diagram of an embodiment of the invention, incorporating two thyratron tubes, one therein denoted tube 10; the other therein denoted tube 11. These tube designations are retained in the subsequent drawings.

Figure 5 is a graph in Cartesian coordinates, with time as abscissa and voltage as ordinate, showing the variation as a function of time of various voltages significant in the operation of tube 10 under conditions different from those prevailing in Figure 3.

Figure 6 is a vector diagram showing vectorially most of the voltage data for tube 10 shown graphically in Figure 5.

Figure 7 is a vector diagram showing vectorially certain voltages pertinent to the operation of tube 11 under the conditions prevailing in Figures 5 and 6.

Figure 3:
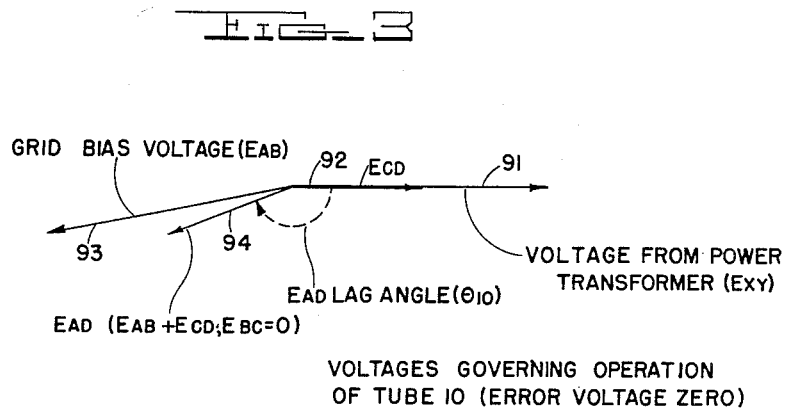
Figure 3 is a vector diagram showing the relative magnitudes and phase relations of various voltages significant in analyzing the operation of tube 10.

The block diagram in Figure 1 shows the invention as it might be incorporated in a system for electrical remote control of a rotating object. The invention to be described herein is shown in Figure 1 as block 60, "Thyratron Motor Control Apparatus."

In the system of Figure 1 control of the rotation of controlled object 56 is achieved by rotation of hand wheel 51, which may be located at any desired distance from the controlled object. Mechanically fixed to the shaft of hand wheel 51 is the rotor of a synchro generator 50, the winding of which is supplied with alternating current from power line 53. The stator windings of generator 50 are connected to the stator windings of control transformer 54. The rotor of control transformer 54 is mechanically fixed to the controlled object 56 so that the rotor and controlled object rotate together. The rotor winding of control transformer 54 is connected to the input of thyratron motor control apparatus 60. D. C. motor 55, mechanically coupled to controlled object 56 and control transformer 54, serves as the means by which they may be rotated. The field winding of motor 55 is supplied with constant excitation current by D.-C. source 52. The armature winding of motor 55 is connected electrically to the output of motor control apparatus 60. Motor control apparatus 60 derives its power from power line 53.

The mechanical coupling between the rotor of control transformer 54 and controlled object 56 is so adjusted that when the controlled object is in the position desired relative to the position of handwheel 51, no voltage is induced in the rotor winding of control transformer 54. If the controlled object be in any position other than the desired position, the rotor of control transformer 54 will not be in neutral position and a voltage will be induced in the rotor winding.

Hereinafter the angular deviation of the transformer rotor from its neutral or desired position will be called "error angle"; the voltage appearing across the rotor winding of the control transformer will be called "error voltage."

The magnitude of the error voltage is proportional to the sine of the error angle; the error voltage will be in time phase with the power line voltage if the transformer rotor is on one side of "neutral" position and 180° out of phase with the power line voltage if it is on the other side of neutral.

The error voltage is applied to the thyratron motor control apparatus; and, responsively to the error voltage, the thyratron motor control apparatus supplies direct current to the armature of motor 55. The direction of rotation of motor 55 depends upon the direction of current flow through its armature; the current supplied will be of that direction, as required by the phase of the error voltage, which will cause the motor's rotation to reduce the error angle. When the motor has moved the controlled object and the control transformer rotor sufficiently to reduce the error angle to zero, the error voltage drops to zero; direct-current output of the control apparatus becomes zero; and the motor stops. The control apparatus, which constitutes the invention herein, possesses inherent dynamic braking and anti-hunting characteristics which tend to prevent the controlled object from "overshooting" the position of zero error voltage.

The foregoing description of the "D.-C. follower" type of motor control system is included herein to show clearly how the apparatus constituting this invention may be used in conjunction with other apparatus in a frequently-employed control application. It is of course exemplary only and does not purport to define the range of the possible applications of this invention. In other applications the "error voltage" which governs the action of the invention might come from any source.

Figure 2 shows in schematic form an exemplary embodiment of the invention. In this embodiment the load fed by the control apparatus is a D.-C. motor 1. The field winding 3 of motor 1 is supplied with constant excitation current from D.-C. source 6. One terminal of armature 2 of motor 1 is connected to terminal Y of secondary winding 24 of transformer 4. The other terminal of armature 2 is connected through choke coil 5 to the plate of thyratron tube 11. The other terminal of secondary winding 24 of transformer 4, marked X on Figure 2, is connected to the plate of thyratron tube 10. Primary winding 14 of transformer 4 is connected to A.-C. power line 7. The plate of tube 10 is connected to the cathode of tube 11, and the plate of tube 11 is connected to the cathode of tube 10. The cathode of tube 10 is marked D; the cathode of tube 11 is marked E. The cathodes of tubes 10 and 11 are connected together through high resistances 8 and 9, which are of equal size, so that point C, at the junction of resistors 8 and 9, is the electrical midpoint between the two cathodes. Tubes 10 and 11 are identical thyratron rectifier tubes.

The primary winding 20 of grid bias transformer 40 is connected in series with variable resistor 16 across power line 7. Secondary winding 30 of transformer 40 is center tapped at point B; one terminal of secondary winding 30, marked A, is connected through resistor 13 to the grid of tube 10; the other terminal of secondary winding 30, marked F, is connected through resistor 12 to the grid of tube 11. Resistors 12 and 13 are grid-current limiting resistors; there is no voltage drop across resistor 13 when the grid of tube 10 is negative relative to its cathode; likewise there is no voltage drop across resistor 12 when the grid of tube 11 is negative relative to its cathode.

Point B, the center tap of secondary winding 30, is connected to point C, the junction of resistors 8 and 9, through secondary winding 35 of error voltage transformer 15. The primary winding 25 of transformer 15 is connected to error-voltage source 19. Error-voltage source 19 is shown as a block connected to A.-C. line 7, since its form will vary according to the character of the application. For purposes of this specification, it may be considered to be any source of alternating voltage of variable amplitude, of the same frequency as that of power line 7 and either identical in phase to the voltage of the power line or 180° out of phase with the power line voltage, depending on the direction of load current flow desired.

Figure 4:
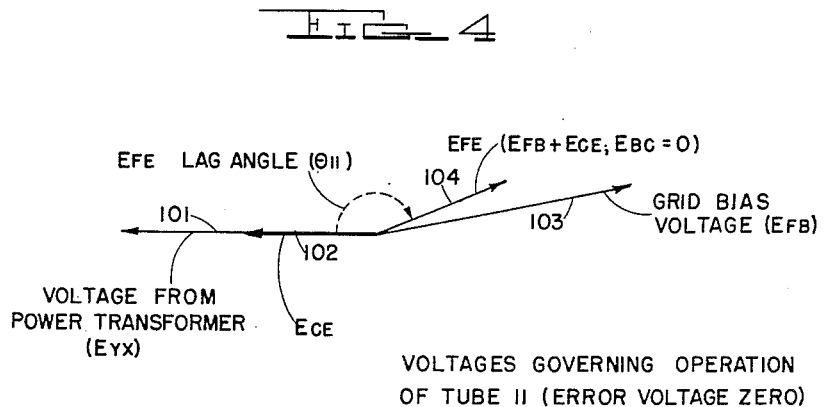
Figure 4 is a vector diagram showing the relative magnitudes and phase relations of various voltages significant in analyzing the operation of tube 11.

Referring to Figures 3 and 4, the operation of the invention will first be described for the case where voltage from the error voltage source is zero. When the tubes 10 and 11 are non-conducting, the current flow through motor armature 2 and smoothing choke 5 is so small as to be negligible, since resistors 8 and 9 have very high resistance. When both tubes are non-conducting, therefore, the voltage of secondary winding 24 of transformer 4 is applied from plate to cathode of tube 10. Likewise the same voltage appears in opposite phase between plate and cathode of tube 11. The voltage across the winding 24 is called $E_{XY}$ or $E_{YX}$, depending on whether it is being considered as the voltage of point X with respect to point Y or the voltage Y with respect to X. $E_{XY}$ is represented in Figure 3 as vector 91; $E_{YX}$ is represented in Figure 4 as vector 101.

Since resistors 8 and 9 are equal, the voltage from point C to point D across resistor 8, hereinafter called $E_{CD}$, is in phase with $E_{XY}$ and half as great in magnitude. Likewise the voltage from point C to point E across resistor 9, hereinafter called $E_{CE}$, is in phase with $E_{YX}$ and half as great in magnitude. $E_{CD}$ is shown on Figure 3 as vector 92; $E_{CE}$ is shown on Figure 4 as vector 102.

The voltages at the terminals A and F of secondary winding 30 of transformer 40, considered with respect to its center tap B, are hereinafter called $E_{AB}$ and $E_{FB}$ respectively. Resistor 16 in the primary circuit of transformer 40, acting in conjunction with the leakage inductance of primary winding 20, causes the voltage across primary winding 20 to lead the power line voltage in phase by about 15°. The connections to secondary winding 30 are so chosen that $E_{AB}$ lags $E_{XY}$ by about 165° and voltage $E_{FB}$ lags $E_{YX}$ by a like amount. The exact phase shift introduced by resistor 16 is not critical; the value of 15° gave excellent results in a practical construction of the invention. The amplitudes of $E_{AD}$ and $E_{FB}$ are likewise not critical, although they should be of the same order of magnitude as $E_{XY}$. In this embodiment the magnitudes of $E_{AB}$ and $E_{FB}$ are each equal to that of $E_{XY}$. $E_{AB}$ is represented on Figure 3 as vector 93; $E_{FB}$ is shown on Figure 4 as vector 103.

The voltage between point B, the center tap of winding 30, and point C, the junction of resistors 8 and 9, is equal to the voltage across the secondary winding 35 of error voltage transformer 15. This voltage is hereinafter called $E_{BC}$.

In the present discussion, the error voltage is assumed to be zero, hence $E_{BC}$ is zero.

The alternating voltages contributing to the grid-cathode voltage of tube 10 are $E_{AB}$, $E_{BC}$, and $E_{CD}$. The voltage $E_{AD}$ is the vector sum of the three last named voltages and is the grid-cathode voltage of tube 10 except insofar as the flow of grid current through resistor 13 causes grid-limiting to occur. That is, the grid-cathode voltage of tube 10 is identical to $E_{AD}$ during its negative half-cycles, but the grid does not follow $E_{AD}$ during its positive half-cycles, remaining limited at a voltage slightly above zero. $E_{AD}$ for the present discussion is the vector sum of $E_{AB}$ and $E_{CD}$, since $E_{BC}$ is zero, and is represented on Figure 3 as vector 94.

The alternating voltages making up the grid-cathode voltage of tube 11 are $E_{FB}$, $E_{BC}$, and $E_{CE}$. The voltage $E_{FE}$ is the vector sum of these voltages, and but for the limiting effect caused by grid current flow through resistor 12 when $E_{FE}$ is positive, $E_{FE}$ is the grid-cathode voltage of tube 11. $E_{FE}$ is the vector sum of $E_{FB}$ and $E_{CE}$ when $E_{BC}$ equals zero, and is represented on Figure 4 as vector 104.

As can be seen by reference to Figure 3, the voltage $E_{AD}$, impressed on the grid circuit of tube 10, lags $E_{XY}$, applied in the plate circuit of tube 10, by an angle $\theta_{10}$, which is about 150°. Likewise, as shown in Figure 4, voltage $E_{FE}$, impressed on the grid circuit of tube 11, lags $E_{YX}$, applied in the plate circuit of tube 11, by an angle $\theta_{11}$, also about 150°. $\theta_{10}$ and $\theta_{11}$ are equal when the error voltage is zero.

These phase angles $\theta_{10}$ and $\theta_{11}$ are such, when the error voltage is zero, that the grid of each tube rises above the critical ionization or "firing" potential just before the end of the positive half cycle of plate circuit voltage, $E_{XY}$ for tube 10, $E_{YX}$ for tube 11. In consequence each tube conducts for a small part of each cycle; $E_{XY}$ and $E_{YX}$ are opposite in phase; accordingly, tube 10 conducts for a brief period at the end of one half-cycle, and tube 11 conducts for a similar period at the end of the next half-cycle, and so on. The result is a small alternating current flowing in the load circuit. Since the average value of this current is zero, it does not cause armature 2 to rotate. So long as the error voltage equals zero, the motor is motionless.

Now assume the external conditions are so altered as to produce an error voltage at the primary winding of transformer 15. $E_{BC}$, the voltage across the secondary winding of transformer 15, assumes a value other than zero and is added vectorially to both $E_{AD}$ and $E_{FE}$. As a result the alternating voltage in the grid circuit of one of the tubes will advance in phase and shrink in amplitude, thus causing that tube to conduct earlier in the cycle than before. The alternating voltage in the grid circuit of the other tube will be retarded in phase and increased in amplitude; so that the other tube will fire later in the cycle, or not at all if the error voltage be large. In consequence a net direct current flow through the motor armature; and the motor will rotate in one direction or the other depending on which tube is firing first. Reversal of the phase of the error voltage will interchange the roles of the two tubes, cause the armature current to reverse, and thus reverse the motor's direction of rotation.

Figure 5 is a voltage vs. time graph which shows the operation of tube 10 for a case wherein the error voltage is phased to advance the firing time of tube 10. Figure 5 may be examined in connection with Figure 6, which is an equivalent vector diagram. Each vector on Figure 6 bears an identification number 100 units larger than the identification number of the corresponding curve on Figure 5; that is, vector 221 on Figure 6 corresponds to curve 121 on Figure 5, etc.

On Figure 5, curve 121 shows the variations with time of $E_{XY}$, applied in the plate circuit of tube 10. Curve 124 is $E_{CD}$, half as great in amplitude as $E_{XY}$ and in phase with it. Curve 123 is $E_{BC}$, the error voltage; it is in phase with $E_{CD}$. The voltage $E_{AB}$, from the grid bias transformer, is shown as curve 122, equal in amplitude to $E_{XY}$ and almost 180° out of phase with it. The voltage $E_{AD}$, which is the vector sum of the three voltages $E_{AB}$, $E_{BC}$, and $E_{CD}$, is the net voltage impressed on the grid circuit of tube 10 and is shown as curve 127. Curve 126 is the instantaneous value of the thyratron firing voltage, plotted as a function of time. When the grid-cathode voltage becomes more positive than the firing voltage, that is, at intersection of curves 127 and 126, the gas in the tube ionizes and for the remainder of the half cycle of $E_{XY}$ the tube conducts. These conducting periods are indicated by the shaded areas 128. During these conducting periods the plate-cathode potential of tube 10 drops to a very low value and the voltage $E_{XY}$ appears across armature 2 and smoothing inductance 5.

Figure 6 and Figure 7, considered together, contrast the operation of the two tubes when an error voltage is present. Vector 94 from Figure 3, which represents $E_{AD}$, the grid circuit voltage of tube 10 for zero error voltage, has been incorporated in Figure 6 for reference. Note from Figure 6 that the addition of $E_{BC}$ to the grid circuit voltage of tube 10 results in a new $E_{AD}$ vector 227 which is reduced in amplitude compared to vector 94. Also note that the lag angle $\theta_{10}$ between the grid circuit voltage and the plate circuit voltages is smaller than before. Each of these effects tends to advance the firing time of tube 10.

Vector 104, representing $E_{FE}$, the grid circuit voltage of tube 11 for zero error voltage, has been incorporated in Figure 7 for reference. Note from Figure 7 that voltage $E_{BC}$ is bucking $E_{CE}$, resulting in a new $E_{FE}$ vector 327, which is larger in amplitude than vector 104. Also note that the lag angle $\theta_{11}$ is larger than before. Each of these effects tends to retard the firing time of tube 11.

If the error voltage applied to transformer 15 were reversed in phase, tube 11 would conduct earlier in each cycle than with no error voltage and tube 10 would conduct later, with the result that the direction of the armature current would reverse. The magnitude of the average current through the armature is approximately proportional to the magnitude of the error voltage. Consequently, by use of this invention, the motor may be reversed or smoothly varied in speed by control of the magnitude and phase of the error voltage. The error voltage source is not required to supply any appreciable amount of power, and the total error voltage required is small.

This invention possesses inherent anti-hunting and dynamic braking characteristics which make it well suited for use in a system such as that shown in block form in Figure 1. When the motor is rotating, its D.-C. back electromotive force is impressed across resistors 8 and 9, thus introducing into the grid circuits of the thyratrons a D.-C. voltage of such polarity as to oppose the firing of the tube which is passing the armature current. In consequence, if the error voltage drops, the D.-C. voltage from the motor's back E.M.F. takes control, prevents the previously conducting tube from passing any more current and accelerates the firing of the other tube, thus passing current through the armature in the opposite direction and quickly braking the motor. The overall result is a heavily damped system which starts and stops smoothly and has no tendency to oscillate around a rest position.

It will be understood that the embodiment of the invention described herein is exemplary only, and that the scope of the invention is to be determined from the appended claims.

The invention described herein may be manufactured and used by or for the Government of the United States of America for governmental purposes without the payment of any royalties thereon or therefor.

What is claimed is:

1. In combination, a pair of grid-controlled, gas-filled rectifier tubes, each having a cathode, an anode, and a grid; means connecting the anode of each tube to the cathode of the other; an alternating power supply connected across the tubes to form a controlled power circuit; load means connected in series in said controlled power circuit; means including a phase shift circuit coupling an alternating voltage to the grid of each tube lagging the anode voltage applied thereto by more than 90° and less than 180°; and means for introducing a voltage in like phase to both grids to vary the relative conduction of the tubes.

2. In combination, a pair of grid-controlled, gas-filled rectifier tubes, each having a cathode, an anode, and a grid; means connecting the anode of each tube to the cathode of the other; an alternating power supply connected across the tubes to form a controlled power circuit; load means connected in series in said controlled power circuit; means in said controlled power circuit operative to supply a grid bias voltage to the grid of each tube in phase with its anode voltage; means including a phase shift circuit for supplying to the grid of each tube an additional voltage lagging its anode voltage by more than 90° and less than 180°; and means for introducing a voltage in like phase to both grids to vary the relative conduction of the tubes.

3. In combination, a pair of grid-controlled, gas-filled rectifier tubes, each having a cathode, an anode, and a grid; means connecting the anode of each tube to the cathode of the other; an alternating power supply; a load element connected in series with the tubes across the power supply; impedance means connected between the cathodes; first alternating bias voltage supply means connected between the mid-point of said impedance means and the grid of one of the tubes; second alternating bias voltage supply means connected between said mid-point and the grid of the other tube each alternating voltage bias supply means providing a biasing voltage lagging to respective anode voltage by more than 90° and less than 180°; a source of alternating control voltage coupled in like phase to both grids; and means for varying the amplitude of the control voltage and controlling its phase to vary the relative conduction of the tubes and thereby to control the magnitude and direction of the average current in the load element.

4. A motor control system comprising a pair of grid-controlled, gas-filled rectifier tubes, each having a cathode, an anode, and a grid; means connecting the anode of each tube to the cathode of the other; an alternating power supply; a direct-current motor; means supplying the motor with constant field excitation; means connecting the motor armature in series with the tubes across the power supply; impedance means connected between the cathodes; means including a phase shift circuit supplying an alternating bias voltage to the grid of each tube lagging the respective anode voltage by more than 90° and less than 180°; a source of alternating control voltage coupled in like phase to both grids; and means operable to vary the amplitude and phase of the control voltage to vary the relative conduction of the tubes, and thereby to vary the magnitude and direction of the current fed to the motor armature.

5. A motor control system comprising a pair of grid-controlled, gas-filled rectifier tubes, each having a cathode, an anode, and a grid; means connecting the anode of each tube to the cathode of the other; an alternating power supply; a direct-current motor; means supplying the motor with constant field excitation; means connecting the motor armature in series with the tubes across the power supply; impedance means connected between the cathodes; phase-shifting means; a bias transformer having a primary winding and a center-tapped secondary winding, the primary winding being connected to the power supply through the phase shifting means and the terminals of the secondary winding being connected to the respective grids of the tubes; a source of alternating control signal connected between the center-tap of the bias transformer secondary winding and the midpoint of said impedance means; and means for varying the control signal to control the speed of the motor's rotation and the direction of its rotation.

MYRON G. PAWLEY.

REFERENCES CITED

The following references are of record in the file of this patent:

UNITED STATES PATENTS

| Number | Name | Date |
|---|---|---|
| 1,924,459 | Ryder | Aug. 29, 1933 |
| 1,977,624 | Davis | Oct. 23, 1934 |
| 2,293,502 | Herrmann | Aug. 18, 1942 |
| 2,399,695 | Satterlee | May 7, 1946 |